July 1, 1930.  C. A. GUSTAFSON  1,769,639
LOW WATER ALARM DEVICE
Filed March 25, 1929

INVENTOR
Carl A. Gustafson
BY John R. Hobson
ATTORNEY

Patented July 1, 1930

1,769,639

UNITED STATES PATENT OFFICE

CARL A. GUSTAFSON, OF PHILADELPHIA, PENNSYLVANIA

LOW-WATER-ALARM DEVICE

Application filed March 25, 1929. Serial No. 349,651.

My invention relates to low-water alarm devices and has particular relation to devices for automatically sounding an alarm when the height of the water in a cooking utensil or the like reaches a predetermined low level.

In the culinary and other arts it frequently happens that complete evaporation of the water contained in a cooking or other utensil takes place, resulting in damage to the said utensil and loss of the foodstuff or other substance being boiled or heated therein. Thus, in the boiling of foodstuffs in aluminum utensils, evaporation of all the water therein is apt to permit the said utensils to become sufficiently overheated to render unfit for use the foodstuffs being cooked or boiled therein and to destroy the said utensils.

In order to overcome the above mentioned difficulties, various devices and appliances have been proposed for sounding an alarm or for interrupting the supply of fuel such as gas, in the event that the water in the vessel or utensil in which foodstuff is being cooked by boiling, reaches a certain low level. However, such devices have not proved to be practical and have not gone into commercial use, so far as I am aware, probably because of the fact that they are comparatively complicated in construction, and because their use generally necessitates modifying or reconstructing the stove or heating means with which they are intended to be used.

It therefore is the object of my invention to provide a novel device of the above character which is of marked simplicity in construction, is efficient in use and which may be used in conjunction with any well known heating means without modifying the construction of the latter in any respect whatsoever.

Another object of my invention is to provide a low-water alarm device of novel character which is or may be of comparatively light weight, which is of attractive appearance and which is so constructed as to permit the same to be interposed between a cooking or other utensil and the source of heat therefore without materially interfering with the heating of the said utensil.

A further object of my invention is to provide a novel low-water alarm device which operates accurately and is not affected by heat when in use as an alarm device, and which also may be used as a scale or balance for weighing various objects and substances. Thus, a device embodying my invention is of especial utility for weighing foodstuffs and the like.

It also is an object of my invention to provide a low-water alarm device which is relatively low in height, which may be adjusted between wide limits to close an electric circuit when the level of the water contained in a utensil supported thereon reaches a predetermined minimum height, and the operation of which is not affected by the agitating or stirring of the contents of the said utensil which may be supported thereon.

Other objects of the invention will be pointed out in the detailed description thereof which follows or will become apparent from such description.

In order that the invention may be readily understood and its manifold practical advantages appreciated, reference may be had to the accompanying drawing in which I have illustrated one form of embodiment thereof. But it is to be understood that the invention is susceptible of embodiment in other forms of construction than that shown, and various changes may be made in the details of construction, without departing from the scope of the appended claims.

Figure 1:
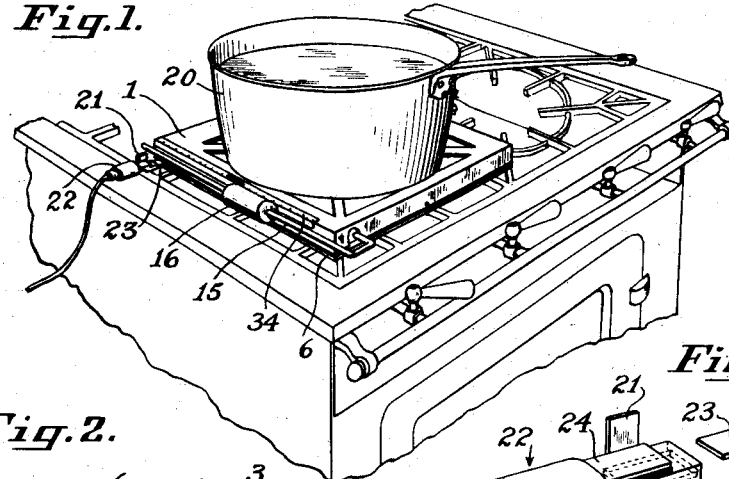
Fig. 1 is a view in perspective showing a device embodying my invention resting upon the grating of a gas stove of known construction, and showing a cooking utensil supported thereby above one of the burners of the said stove, the said utensil containing water or other liquid the low level of which is or may be indicated by the said device.

Referring to the drawing, it will be observed that the illustrated embodiment of my invention comprises a movable top or platform designated generally at 1, pivotally supported by downwardly extending pointed pivot screws 2 located at or near the corners of the said top, and received by recesses 3 formed in the tops of the longitudinally extending lever-bars 4 near the ends thereof. The said lever-bars in turn are pivotally supported in similar manner by the pointed pivot screws 5 which extend upwardly from the base or bottom 6 in inwardly offset relation to pivot screws 2, and are received by recesses 7 formed in the undersides of the said lever-bars. The top or platform 1, which may consist of a metal stamping, or the like is provided with diagonally extending bars 8 which serve to strengthen the said top and to support utensils or the like of various sizes which may be placed thereon. The presence of these bars causes openings to be formed in the said top which in the construction shown are of general triangular shape and which permit free access of hot gases from the stove or other heating means to the bottom of the said utensil. The said top or platform is further strengthened by the downwardly extending flanges formed on the edges thereof as indicated at 9, which flanges also conceal from view the underneath structure of the device. The base 6 which may consist of steel or cast iron is of relatively rigid but open construction, permitting free and unobstructed passage of hot gases upwardly therethrough.

The lever-bars 4 already referred to, which constitute portions of the said concealed structure and are engaged from above and below near their ends by the said pointed screws or pivots 2 and 5 respectively as above stated, are held in assembled relation by the inter-engaging transversely extending lever-arms 10 and 11 which project toward each other through recesses of suitable size formed in the said lever bars near the front ends thereof, and are held therein by suitable means such as pins as indicated at 12. These lever-arms 10 and 11 are held in inter-engaging relation by means of the tapered slot 13 and the tongue 14 received therein formed respectively in and upon the adjoining ends of said lever-arms which, however, permit movements of the latter relative to each other. It will be noted that the lever-bars 4 and their respective lever-arms 10 and 11 form in effect a pair of L-shaped levers of the first class.

Figure 2:
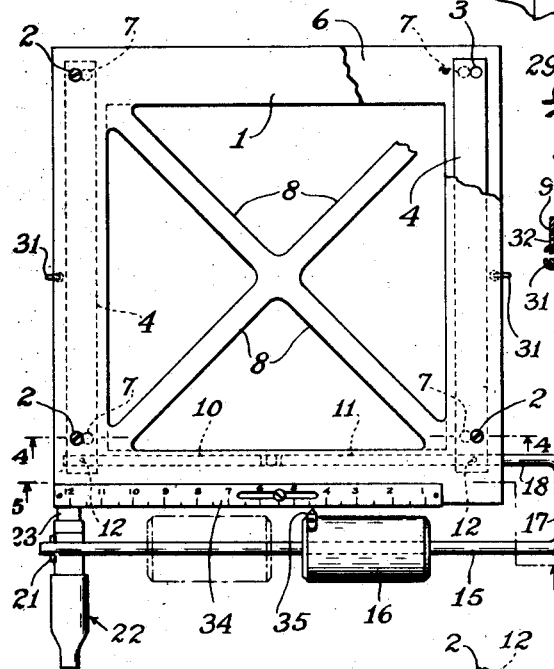
Fig. 2 is a view in top plan of the device shown in Fig. 1, a portion thereof being broken away to show more clearly the underneath construction of the said device.
Figure 7:
Fig. 7 is a view in perspective on slightly enlarged scale of the said novel electrical connecting means.
Figure 4:
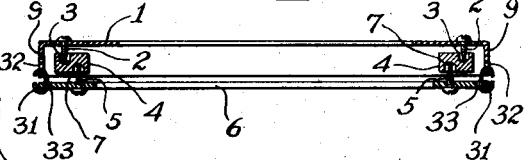
Fig. 4 is a view in vertical transverse section taken on the line 4—4 of the said Fig. 2.

It now will be seen that as a result of the offset relation of the pivots 5 and 2 and the inter-connection of the lever-bars 4 by the above described connection of the lever-arms 10 and 11, the placing of a weight such as a utensil or the like on the top or platform 1 of the device will cause the latter to be moved downwardly. In order to resist or counterbalance such downwardly acting force under circumstances and in a manner to be described later, scale beam 15 which extends parallel to and in front of the front edge portion of the top 1 is provided, upon which is slidably mounted the weight 16 as shown. The said scale beam, which may consist of rod material, is connected preferably integrally by the rearwardly and downwardly extending rod portion 17 with the laterally extending end portion 18 of lever 11, which portion projects outwardly through an enlarged opening 19 in the adjoining flange 9, thereby forming an integral member of general U-shape as is clearly shown in Fig. 2. It will be understood that the said scale beam 15 may be formed and connected to lever 11 in any other manner as may be desired.

From the foregoing, it will be noted that when a utensil or the like such as shown at 20 in Fig. 1 is placed on the platform of the device, the lowering of the said platform will cause corresponding upward movement of scale beam 15 carrying weight 16, and that the force of gravity acting on the said weight will tend to oppose the lowering of the said platform. As will be obvious, the degree of such force may be varied to greater or less extent by sliding the said weight 16 to the left or to the right (looking at Fig. 2, for example).

Figure 6:
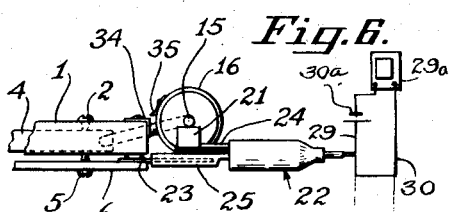
Fig. 6 is a view in elevation of a fragmentary front end portion of the device shown in Fig. 2, and showing novel means invented by me for connecting an electric circuit to the device.
Figure 5:
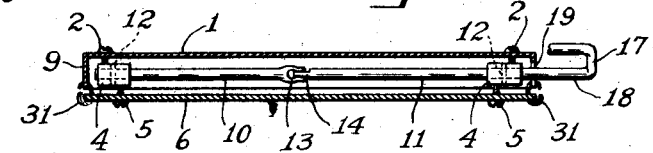
Fig. 5 is a view in vertical transverse sectional elevation taken on the line 5—5 of Fig. 2.
Figure 3:
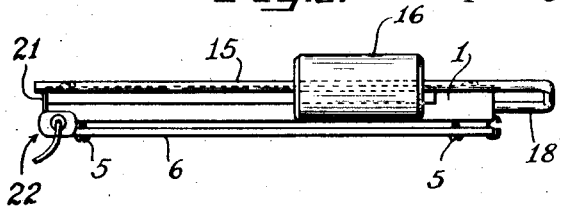
Fig. 3 is a view in front elevation of the device shown in the said Fig. 2.

In order to sound an alarm when the level of water in a cooking utensil or the like drops to a predetermined low level, as by energizing an electric buzzer, bell, or the like hereinafter referred to, I have provided means whereby the rising of platform 1 and the corresponding lowering of scale beam 15 results in the closing of an electric circuit. The said means comprises an upwardly projecting contact 21 connected to one side of the circuit carried by a plug connection designated generally at 22, and a contact or projection 23 secured to the base 6 of the device for electrically connecting the latter to the other side of the said circuit, and for supporting the said plug in such position that the contact 21 carried thereby will be located directly beneath and in the path of movement of the free end of the scale beam 15. The said plug comprises an upper plate 24 and a lower plate 25 upon which are formed respectively the contact 21 and a socket 26 adapted to fit the projection or contact 23 previously referred to. The plates 24 and 25 which consist of suitable electrical conducting material are insulated from each other by suitable fireproof material interposed therebetween such as sheets of mica indicated at 27 while the body 28 of the plug which consists of suitable insulating material serves to hold the said plates and insulation in assembled relation as will be understood. For connecting the plates 24 and 25 to the desired circuit, insulated conducting wires 29 and 30 designated plus and minus respectively are connected to the said plates in known manner. It now will be seen that when the plug 22 is in engagement with the lug 23, the lowering of the platform 1 will permit the end of the scale beam to contact with contact 21 thereby closing the circuit including the wires 29 and 30 which are or may be connected in series to an electric buzzer 29$^a$ or the like, and a battery 30$^a$, as shown diagrammatically in Fig. 6.

While I have referred to the use of my device for sounding an alarm, it will be obvious that the circuit closer thereof may be used for other purposes. For example, the said circuit closer may be used for energizing an electrically operable valve for interrupting the supply of gas if the device is used on a gas stove; or if the device is used on an electric stove, the said circuit closer may be employed for interrupting the flow of electric current thereto in similar manner.

In order to hold the parts of my device in assembled relation, links 31 consisting of open loops of wire, are provided in engagement with enlarged openings 32 and 33 formed respectively in flanges 9 of the top 1 and in the outer edges of the base 6. These links engage their respective openings loosely and do not interfere with the normal operation of the device, but do permit the device to be handled as a unit. Moreover, they may easily be removed when it is desired to separate the platform from the base to clean the inner parts of the device.

In the use and operation of my novel device, it may be placed upon the top of any well known heating means such as a gas stove as shown in the drawing. The device may be, and preferably is, so positioned as to permit the flame of the burner of the stove to pass upwardly therethrough. When so positioned, a utensil containing the minimum amount of water required is placed thereon and the weight 16 is adjusted to counterbalance exactly the weight of the utensil and its contents. Water is thereupon supplied to the utensil in desired quantity and the heating thereof begun. The addition of the excess of water will cause the platform 1 to be lowered and the scale beam 15 to rise. When the water in the utensil evaporates to such an extent that the remaining water is equal in quantity to that initially contained in the utensil, the weight 16 will act to raise the platform 1 and to cause the scale beam to be lowered into contact with the contact 21 to close the electric circuit including conductors 29 and 30 and causing a buzzer or electrically operated valve or switch (neither of which is shown) to be operated as stated already.

One of the most important features of my invention resides in the fact that a device embodying the same may be used for weighing foodstuffs and the like. To this end, an indicating scale 34 is adjustably secured to the front edge portion of the top 1 by a screw extending through a slot in the said scale as shown, with which scale a pointer 35 provided on weight 16 cooperates. It will be apparent that the said device may be used for weighing without making any adjustment or change in the construction thereof other than the adjusting of the weight.

From the above description it will become apparent that I have provided a novel and practical device for the purposes hereinbefore set forth. My device presents many advantages over similar devices hitherto contemplated among which may be mentioned the fact that it is of relatively simple but rugged construction and may be produced economically; will permit a gas flame or other hot gas to pass therethrough; is of light weight and consequently of low heat mass; is flexible in operation because of the large ratio between the lengths of lever arms 10 and 11 to the effective width of lever bars 4 which permits weighing between wide limits; is rendered attractive in appearance by its low height and the concealment of the underneath structure thereof; is not affected by stirring the contents of a utensil which may be supported thereon because downward pressure on platform 1 merely raises the scale beam higher; and may be used in conjunction with any heating means without requiring alteration of the latter.

While the illustrated embodiment of my device is square in shape, it will be understood that it may be round or any other shape, in fact I contemplate making devices embodying the invention which are round and of such size as to fit in the round openings of cook stoves and electric ranges. Moreover, my invention is not limited to houshold or domestic use but also may be employed for industrial and laboratory purposes as will be apparent.

Having thus described my invention, what I desire to claim and to secure by Letters Patent is:

1. In a low-water alarm device in combination, a base, a platform supported upon said base, levers interposed between and having pivotal engagement with said platform and base, whereby said platform is supported for movement toward and away from said base, a scale beam connected to one of said levers for oscillation in response to a predetermined movement of said platform, an electric circuit including a pair of conductors, a contact connected to one of said conductors, and means on said base for connecting the other of said conductors thereto and for holding said contact in the path of movement of said scale beam, whereby said beam closes said circuit in response to the predetermined movement of said platform.

2. In a low-water alarm device in combination, a base, a platform supported on said base, said base and platform being of open construction, pivots formed on said base and platform respectively, the pivots on said base being offset inwardly with respect to the others of said pivots, inter-connected levers interposed between said pivots and serving to support the platform for movement toward and away from said base, depending flanges formed on said platform for concealing from view the said pivots and levers, a scale beam connected with one of said levers for oscillation in response to a predetermined movement of said platform, an electric circuit including a pair of conductors, one of said conductors having a contact connected thereto, and means for connecting the other of said conductors to the said base and for holding the said contact in the path of movement of the said scale beam, whereby said scale beam engages said contact in response to the predetermined movement of said platform.

3. A low-water alarm device comprising a base, a platform, said base and platform being of open construction, lever means interposed between and having pivotal engagement with said base and platform, whereby said platform is supported for movement toward and away from said base, an alarm, and means operated on predetermined movement of said platform for sounding said alarm.

4. A low-water alarm device comprising, a base of open construction adapted to rest upon a heating means of standard type, a platform of open construction mounted on said base, lever means interposed between and having pivotal connection with said base and platform, for movably supporting said platform for movement toward and away from said base, an electric circuit, and means operated on predetermined movement of said platform for closing said circuit.

5. A portable low-water alarm device comprising a base, a platform, lever means interposed between the base and platform for supporting the platform for movement toward and away from the base, means removably connected to said platform and base for loosely retaining them in assembled unitary relation, an electric circuit, and means operated on a predetermined movement of said platform for closing said circuit.

6. A portable low-water alarm device comprising a base, a platform, lever means interposed between said platform, and base for supporting said platform for movement toward and away from said base, means formed on said platform for concealing said lever means from view, an electric circuit, and means operated on a predetermined movement of said platform for closing said circuit.

7. A low-water alarm device comprising a base, a platform, said platform and base being of open construction, lever means interposed between and having pivotal connection with the base and platform for supporting the platform for movement toward and away from the base, an electric circuit including a pair of conductors, removable means for electrically connecting one of said conductors to said base, a contact carried by said last named means, and means electrically connected to said base and operated on predetermined movement of said platform for engaging said contact to close said circuit.

Signed at Philadelphia, Pa., this 14th day of March, 1929.

CARL A. GUSTAFSON.